(12) United States Patent
Bates et al.

(10) Patent No.: US 9,634,522 B2
(45) Date of Patent: Apr. 25, 2017

(54) POWER GRID DATA MONITORING AND CONTROL

(71) Applicant: International Business Machines Corporation, Armonk, NY (US)

(72) Inventors: Allen K. Bates, Tucson, AZ (US); Dov N. Hepner, Hertzelyia (IL); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 13/622,759

(22) Filed: Sep. 19, 2012

(65) Prior Publication Data

US 2014/0081472 A1 Mar. 20, 2014

(51) Int. Cl.
*G06Q 10/06* (2012.01)
*G06Q 50/06* (2012.01)
*H02J 13/00* (2006.01)

(52) U.S. Cl.
CPC .............. *H02J 13/00* (2013.01); *G06Q 10/06* (2013.01); *G06Q 50/06* (2013.01); *H02J 13/0006* (2013.01); *Y04S 10/10* (2013.01)

(58) Field of Classification Search
CPC ...... H02J 13/00; H02J 13/0006; G06Q 10/06; G06Q 50/06; G06F 11/3072
USPC ............................................ 700/286; 702/60
See application file for complete search history.

(56) References Cited

U.S. PATENT DOCUMENTS 5,255,208 A * 10/1993 Thakore et al. ............. 702/185
6,745,107 B1 * 6/2004 Miller ........................... 700/282
7,305,281 B2 12/2007 Scott et al.
7,490,013 B2 2/2009 Wells
7,523,098 B2 4/2009 Hirsch et al.
7,567,188 B1 7/2009 Anglin
(Continued)

OTHER PUBLICATIONS

Aronovich et al., "The Design of a Similarity Based Deduplication System", SYSTOR '09 Proceedings of SYSTOR 2009:The Israel Experimental Systems Conference, May 4-6, 2009, Haifa, Israel. Published in ACM, New York, NY. DOI: 10.1145/1534530. 1534539.

(Continued)

*Primary Examiner* — Jason Lin
(74) *Attorney, Agent, or Firm* — Jay Wahlquist

(57) ABSTRACT

A method for identifying conditions that correlate with one ore more events related to operation of a power grid. The method includes the determining one or more distinguishing characteristics of a first chunk. The first chunk includes data elements relevant to operating a power grid. The method also includes determining whether a distinguishing characteristic of the first chunk correlates with a distinguishing characteristic of one or more of a plurality of second chunks. Each second chunk includes a plurality of data elements corresponding with the data of the first chunk. The method further includes determining whether a second chunk, having a distinguishing characteristic equivalent to a distinguishing characteristic of the first chunk, is associated with the one or more events. In addition, the method includes determining whether a second chunk, having an association with the one or more events and a distinguishing characteristic equivalent to a distinguishing characteristic of the first chunk, is substantially identical to the first chunk.

17 Claims, 6 Drawing Sheets

(56) References Cited

U.S. PATENT DOCUMENTS

| | | | |
|---|---|---|---|
| 7,571,028 | B2 | 8/2009 | Lapinski et al. |
| 7,761,736 | B2 | 7/2010 | Nguyen et al. |
| 7,840,395 | B2 | 11/2010 | Nasle et al. |
| 7,984,965 | B2 | 7/2011 | Silverbrook et al. |
| 8,055,618 | B2 | 11/2011 | Anglin |
| 8,126,685 | B2 | 2/2012 | Nasle |
| 8,751,432 | B2* | 6/2014 | Berg-Sonne et al. ........... 706/48 |
| 2003/0036890 | A1 | 2/2003 | Billet et al. |
| 2005/0096759 | A1* | 5/2005 | Benjamin et al. .............. 700/62 |
| 2005/0278075 | A1* | 12/2005 | Rasmussen ............... H02J 9/06 700/286 |
| 2006/0059173 | A1* | 3/2006 | Hirsch et al. ................. 707/100 |
| 2006/0059207 | A1 | 3/2006 | Hirsch et al. |
| 2006/0123189 | A1 | 6/2006 | Bitner et al. |
| 2008/0275874 | A1 | 11/2008 | Goyal |
| 2009/0063122 | A1 | 3/2009 | Nasle |
| 2009/0070383 | A1 | 3/2009 | Boyd et al. |
| 2009/0076749 | A1 | 3/2009 | Nasle |
| 2009/0326731 | A1 | 12/2009 | Bowdry et al. |
| 2010/0100250 | A1 | 4/2010 | Budhraja et al. |
| 2010/0198797 | A1 | 8/2010 | Wideman et al. |
| 2010/0217550 | A1* | 8/2010 | Crabtree ............. H02J 13/0079 702/62 |
| 2010/0241608 | A1 | 9/2010 | Huang et al. |
| 2011/0106321 | A1 | 5/2011 | Cherian et al. |
| 2011/0130982 | A1* | 6/2011 | Haag et al. ..................... 702/62 |
| 2011/0172938 | A1 | 7/2011 | Gu et al. |
| 2011/0185149 | A1 | 7/2011 | Gruhl et al. |
| 2011/0208366 | A1* | 8/2011 | Taft ............................. 700/295 |
| 2011/0264276 | A1* | 10/2011 | Kressner et al. ............. 700/276 |

OTHER PUBLICATIONS

Carreras et al., "Initial Evidence for Self-Organized Criticality in Electric Power System Blackouts", Proceedings of the 33rd Annual Hawaii International Conference on System Sciences, Jan. 4-7, 2000, Maui, HI, pp. 1-6, © 2000 IEEE. DOI: 10.1109/HICSS.2000.926768.

Carreras et al., "Blackout Mitigation Assessment in Power Transmission Systems", Proceedings of the 36th Annual Hawaii International Conference on System Sciences, Jan. 6-9, 2003, Maui, HI., pp. 1-10. DOI: 10.1109/HICSS.2003.1173911.

Carreras et al., "Complex Dynamics of Blackouts in Power Transmission Systems", Chaos: An Interdisciplinary Journal of Nonlinear Science, vol. 14, No. 3, Sep. 2004, pp. 643-652, Received Aug. 27, 2003, Accepted Jun. 21, 2004, Published Online Sep. 1, 2004, © 2004 American Institute of Physics. DOI: 10.1063/1.1781391.

Dobson et al., "Towards Quantifying Cascading Blackout Risk", Bulk Power System Dynamics and Control—VII. Revitalizing Operational Reliability, 2007 iREP Symposium, Aug. 19-24, 2007, pp. 1-12, Charleston, SC. DOI: 10.1109/IREP.2007.4410554.

Dzurik, S., "IBM ProtecTIER Deduplication Solutions" Powerpoint Presentation, © 2011 IBM Corporation.

Ferryman, T and Amidan, B., "Statistical Analysis of Abnormal Electric Power Grid Behavior", Proceedings of the 43rd Hawaii International Conference on System Sciences, Jan. 5-8, 2010, Maui, HI., pp. 1-8. DOI: 10.1109/HICSS.2010.349.

Karp, R. and Rabin, M., "Efficient randomized pattern-matching algorithms", IBM Journal of Research and Development, vol. 31, Issue 2, Mar. 1987, pp. 249-260, IBM Corporation, Riverton, NJ. DOI: 10.1147/rd.312.0249.

Shortle, J. and Chen, C., "What Can Lead to a Wide-Scale Blackout?", Sigma: Rare Events, Sep. 2010, pp. 11-15, vol. 10, No. 1, © 2010, A Noblis Publication, Falls Church, VA.

U.S. Appl. No. 13/526,834, Packing deduplicated data into finite-sized containers, Inventors: Hirsch, M. and Krause, T., Filed Jun. 19, 2012.

\* cited by examiner

POWER GRID DATA MONITORING AND CONTROL

FIELD

Aspects of the present invention relate, in general, to power grids and more particularly to predicting power grid events.

BACKGROUND

Traditional power grids were primarily made up of power generators that produced consistent, reliable amounts of energy. Fossil fuel plants, hydroelectric plants, and nuclear plants were the staple forms of power generation in older power grids. The electricity produced was carried on the transmission lines of the power grids at high voltages, subsequently stepped-down to lower distribution voltages by transformers, and further stepped-down when received by the end user. Older power grids of this time only produced enough electricity to meet the demand of the end users and did not receive back any of the electricity or information from the end user.

Due to deregulation of the power industry, requirements for renewable energy sources because of environmental initiatives, and new energy saving technologies, the power grid has become more complex. Renewable energy, such as wind and solar energy, produces more variable quantities of electricity depending on the weather. Also, an increased number of market participants, household produced energy, stored energy, and smart appliances have made the power grid a dynamic system with large amounts of data and factors to take into consideration when operating an efficient, reliable power grid.

SUMMARY

In one embodiment, a method for identifying conditions that correlate with one or more events related to operation of a power grid is described. The method includes determining one or more distinguishing characteristics of a first chunk. The first chunk includes data elements relevant to operating a power grid. The method also includes determining whether a distinguishing characteristic of the first chunk correlates with a distinguishing characteristic of one or more of a plurality of second chunks. Each second chunk includes a plurality of data elements corresponding with the data of the first chunk. The method further includes determining whether a second chunk, having a distinguishing characteristic equivalent to a distinguishing characteristic of the first chunk, is associated with the one or more events. In addition, the method includes determining whether a second chunk, having an association with the one or more events and a distinguishing characteristic equivalent to a distinguishing characteristic of the first chunk, is substantially identical to the first chunk.

In another embodiment, a power grid controller is described. The power grid controller has a distinguishing characteristic calculator to determine one or more distinguishing characteristics of a first chunk. The first chunk includes data elements relevant to operating a power grid. The power grid controller also includes a similarity comparator to determine whether a distinguishing characteristic of the first chunk correlates with a distinguishing characteristic of one or more of a plurality of second chunks. Each second chunk includes a plurality of data elements corresponding with the data of the first chunk. The power grid controller also has an event comparator to determine whether a second chunk, having a distinguishing characteristic equivalent to a distinguishing characteristic of the first chunk, is associated with one or more events. The power grid controller also includes an identity determiner to determine whether a second chunk, having an association with the one or more events and a distinguishing characteristic equivalent to a distinguishing characteristic of the first chunk, is substantially identical to the first chunk.

In yet another embodiment, a computer readable storage medium having instructions stored thereon which, when executed, cause a processor to perform the following operations. One operation determines one or more distinguishing characteristics of a first chunk. The first chunk includes data elements relevant to operating a power grid. An operation determines whether a distinguishing characteristic of the first chunk correlates with a distinguishing characteristic of one or more of a plurality of second chunks. Each second chunk includes a plurality of data elements corresponding with the data of the first chunk. Another operation determines whether a second chunk, having a distinguishing characteristic equivalent to a distinguishing characteristic of the first chunk, is associated with one or more event. In addition, an operation determines whether a second chunk, having an association with the one or more event and a distinguishing characteristic equivalent to a distinguishing characteristic of the first chunk, is substantially identical to the first chunk.

BRIEF DESCRIPTION OF THE DRAWINGS

Embodiments will be better understood from the following detailed description with reference to the drawings, in which.

In the drawings and the Detailed Description, like numbers generally refer to like components, parts, steps, and processes.

DETAILED DESCRIPTION

Figure 1:
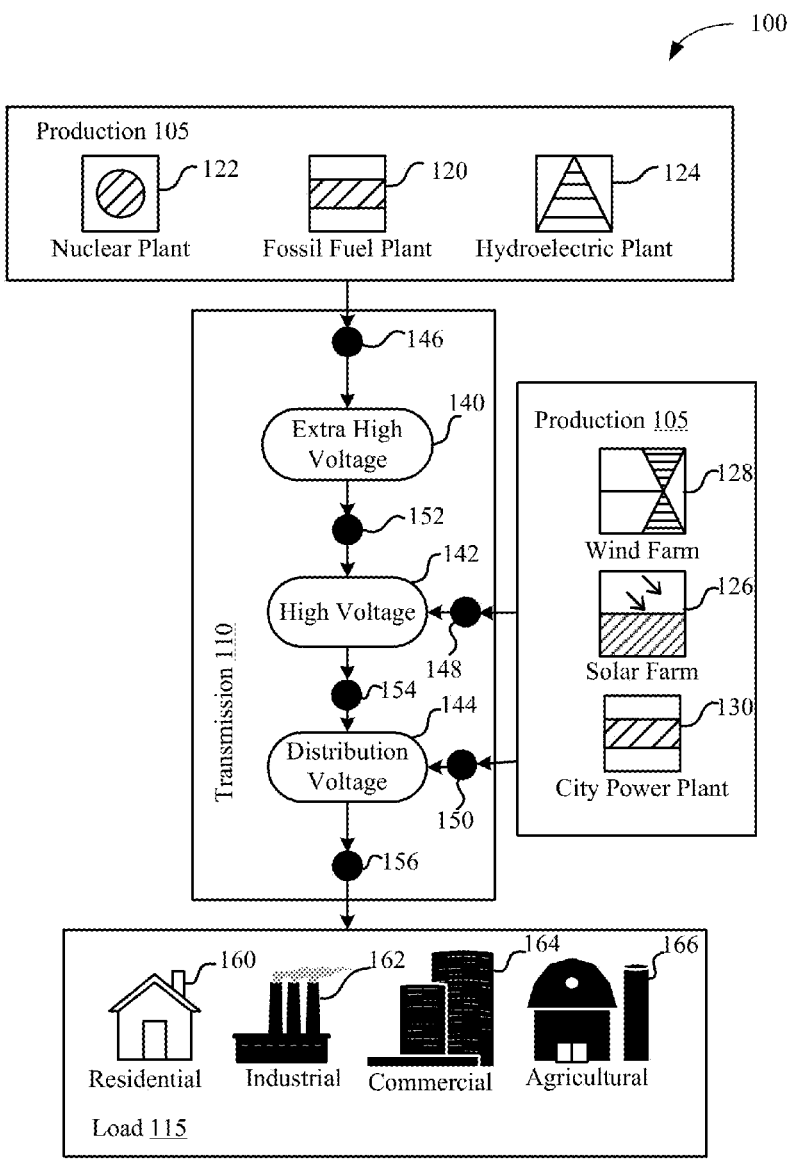
FIG. 1 is a diagram of an exemplary power grid, according to one embodiment.

Embodiments herein provide for a system and method for storing power grid data and managing power grid events. However, it is also contemplated that other applications besides those described or mentioned in this specification will benefit from these embodiments. It should be noted that the features illustrated in the drawings are not necessarily drawn to scale. Descriptions of well-known components and processing techniques are omitted so as to not unnecessarily obscure the aspects of the invention. The examples used herein are intended merely to facilitate an understanding of ways in which the aspects of the invention may be practiced and to further enable those of skill in the art to practice the invention. It is also to be understood that the descriptions of the embodiments are provided by way of example only, and are not intended to limit the scope of this invention as claimed FIG. 1 illustrates a simplified, exemplary power grid 100. The power grid 100 may be divided up into three main components: production 105, transmission 110, and load 115. The production component 105 produces the electricity, while the transmission component 110 delivers the electricity to the end users of the electricity in the load component 115. The production component 105 of the power grid 100 includes the electricity producers of the power grid 100 such as large fossil fuel 120, nuclear 122, and hydroelectric 124 power plants. The production component 105 may also include solar energy 126, wind turbines 128, and smaller municipal power plants 130 among other sources of electricity. Each electricity producer may produce varying amounts of electricity.

Once the electricity is produced by the production component 105 of the power grid 100 the electricity may enter the transmission component 110. The transmission component 110 supplies the electricity to the consumers of the electricity in the load component 115. The load 115 may include residential 160, industrial 162, commercial 164, and agricultural consumers 166. The transmission component 110 may include transmission lines such as extra high voltage 140, high voltage 142, and distribution voltage 144 transmission lines. The transmission lines operate at varying voltage levels to efficiently transport large amounts of electricity over long distances. The transmission component 110 may also include transformers 146, 148, 150, 152, 154, 156. The production component 105 may transfer electricity into any of the three exemplary types of transmission lines 140, 142, 144. The electricity leaving the production component 105 may be transformed to meet the voltage levels carried on the respective transmission lines 140, 142, 144. The conduction of the electricity into the transmission component 110 may be done by transformers 146, 148, 150. Other transformers may transform voltages from higher voltage transmission lines to lower voltages to be transmitted on lower voltage transmission lines. Transformer 152 transforms extra high voltage on transmission line 140 to high voltage on transmission line 142. Transformer 154 transforms high voltage on transmission line 142 to distribution voltage on transmission line 144. Furthermore, transformer 156 transforms the distribution voltage on transmission line 146 to a voltage level that may be used by the consumers in the load 115.

Figure 2:
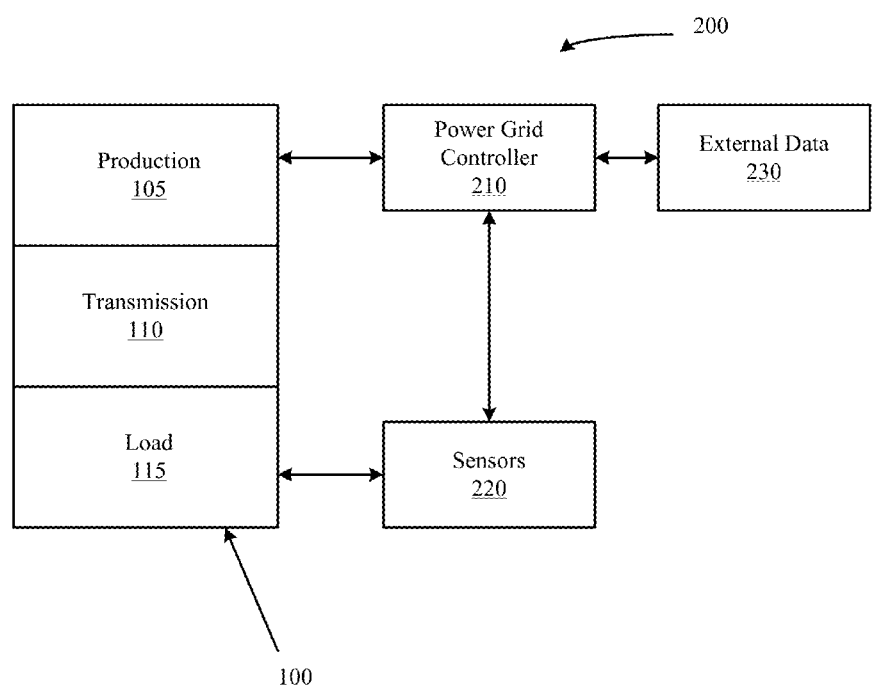
FIG. 2 is a high level block diagram of the power grid interacting with sensors and a power grid controller, according to one embodiment.

FIG. 2 is a block diagram of an embodiment of a power system 200. The power system 200 may include the power grid 100, a power grid controller 210, sensors 220, and external data 230. The power grid 100 may include the power grid components: production 105, transmission 110, and load 115.

The power grid components 105, 110, 115 may produce useful input data for managing the functionality and efficiency of the power grid 100. The components 105, 110, 115 may provide input data as to whether an event affecting the power grid 100 may occur that is either beneficial or detrimental to the power grid 100. The power grid event may be, but is not limited to, brownouts, blackouts, power surges, or an energy surplus. The input data may be useful in predicting whether a power grid event will occur and what action to take to operate the power grid 100.

The managing of the input data may be performed by a power grid controller 210. The power grid controller 210 may output data or actions to the power grid 100 and receive input data from the power grid 100, such as power supply and demand data. Furthermore, the power grid controller 210 may receive sensor 220 data from the power grid 100 and external data 230 about weather and other information that may affect the operations of the power grid 100, which may be included in the input data. The managing and analysis of the input and output data may make the power grid 100 run smoothly with reduced disruption of electricity to consumers.

Figure 3:
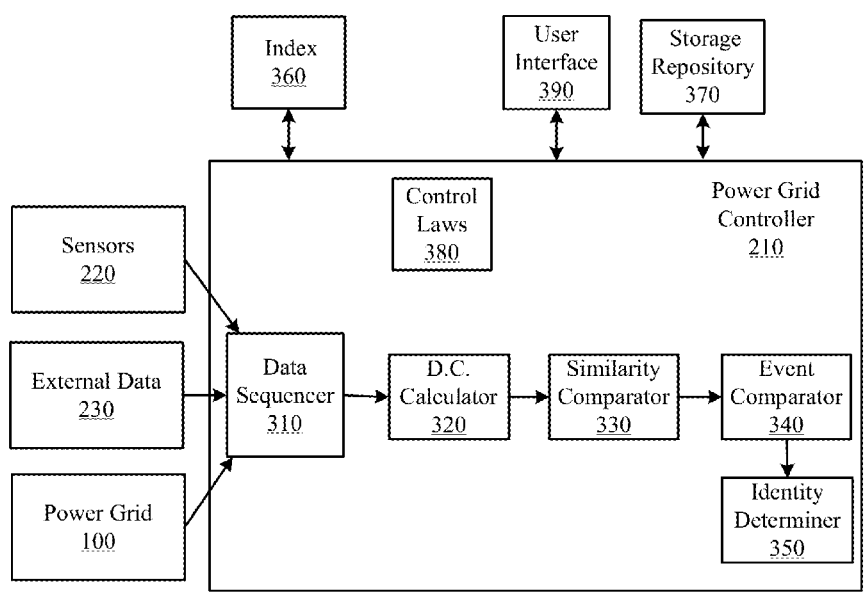
FIG. 3 is a block diagram of the power grid controller, according to one embodiment.

FIG. 3 is a block diagram illustrating an embodiment of the power grid controller 210. FIG. 3 illustrates the power grid 100, sensors 220, external data 230 and the power grid controller 210. The power grid controller 210 may contain a data sequencer 310, a distinguishing characteristic calculator 320, a similarity comparator 330, an event comparator 340, an identity determiner 350, and control laws 380. The power grid controller 210 may be coupled with a repository index 360, a data storage repository 370, and a user interface 390. The power grid controller may perform aspects of methods for data searching, storage, and reduction as described in U.S. Pat. No. 7,523,098, herein incorporated by reference in its entirety.

The data sequencer 310 of the power grid controller 210 may receive input data from sensors 220, the power grid 100, or external data sources 230. The input data may be received by the data sequencer 310 in real time or from a storage database. In one embodiment, the data sequencer 310 ingests and processes data at 500 MB/sec. This is one example of what may be considered real time. However, any rate of processing a large quantity of continuously-generated data relevant to the management of a power grid that is sufficient to generate the outputs described herein in no more than several minutes may be considered real time. Since the input data may be sent from different sources and at different time intervals, the input data may need formatting to an order and structure that may be used to compare the input data with the order and structure of previously received input data that is stored in the data storage repository 370. The data sequencer 310 may format the input data so that the input data may be stored and compared in a user specified manner. The data sequencer 310 may partition the input data into a plurality of input chunks. Each input chunk may include a plurality of data elements. The data elements may be data such as, but not limited to, power supply, power demand, temperature, time of year, geographic location, wind speed, and cloud cover. The data elements may be determined by the control laws 380, which may be user instructions regarding the information to be collected and formatted by the data sequencer 310. The data elements are further described below with respect to FIG. 4.

The power grid controller 210 may also contain a distinguishing characteristic calculator 320. Once the input data is formatted and parsed into input chunks, distinguishing characteristics may be calculated by the distinguishing characteristic calculator 320. Distinguishing characteristics for an input chunk may be compared with one or more repository chunks for determining whether the input chunk is similar to any repository chunk. The repository chunk may be an input chunk that has been previously stored in a data storage repository 370, while the distinguishing characteristics of the repository chunk may be stored in the index 360.

An input chunk may be any suitable size. An input chunk of size m, e.g., 32 MB, may be processed in the following manner. K distinguishing characteristics in the input chunk may be calculated, where k is a parameter that will be explained below (typically of the order of a few tens), and where $k \ll m$. In accordance with one embodiment and described further in U.S. Pat. No. 7,523,098, the k distinguishing characteristics may be calculated as follows:

(1) Calculate a hash value for every seed of the input chunk. The seeds may be of any size s substantially smaller than m, e.g., 4 KB. The hash value for every seed may be calculated using a rolling hash function, which moves in each iteration by one byte forward. A hash value may be calculated in each iteration with respect to the 4 KB seed size accommodated within this range. Where the input chunk size m=32 MB and seed size s=4 KB, there are 33,550,337 (32 MB-4 KB+1) hash values obtained for each input chunk, one at every possible byte offset in the input chunk. With probability practically 1, the hash values for different seeds (containing different data) will all be different.

(2) Next, the k maximum hash values, in descending order, of respective k seeds, may be selected from among the (33,550,337) calculated hash values; these k seeds constitute the k maximum seeds. Thereafter, the k hash values of respective k seeds that follow by one byte (and overlap by s–1 bytes) the k maximum seeds, respectively, may be selected; these k seeds constitute the k distinguishing seeds and their corresponding hash values constitute the k distinguishing characteristics. In alternative embodiments, the k distinguishing characteristics may be selected in any suitable manner; in alternative embodiments, the use of a hash function is not required. Note that the maximum values themselves, have a probabilistic distribution that is not uniform. However, if a good hash function is used, the probabilistic distribution of the following k values will be very close to uniform and therefore better for use as distinguishing characteristics. By uniform distribution it is meant that the k distinguishing characteristics are substantially uniformly distributed as numbers on some range of numbers.

An example hash function is a rolling hash function that calculates the hash values at every byte offset. One example may be a modular hash function, which utilizes, for the sake of illustration, the prime number 8,388,593; the hash function used is h(X)=X mod 8,388,593. In this example, the seed size may be 8 bytes.

Note that the invention is not bound by calculating the distinguishing characteristics in the manner described above. Any selection that yields unique distinguishing characteristics, and is repeatable for a given chunk, may be used in various embodiments.

The power grid controller 210 may also contain a similarity comparator 330. After the distinguishing characteristics are calculated for the input chunk, the distinguishing characteristics may be compared to distinguishing characteristics of repository chunks. The repository chunks form part of a data storage repository 370, which may store a large number of chunks, which may be in the magnitude of petabytes of data. The distinguishing characteristics may be, as previously described, a selected set of hash values generated from well-spread seeds in the input chunk. The index 360 holds the distinguishing characteristics of the repository chunks and associated position data, (e.g. the relative location or address of the chunk in the repository 370). The distinguishing characteristics of the repository chunks may be determined in the same manner described above for an input chunk. Having the index 360 of repository chunk distinguishing characteristics stored in a random access memory (RAM) allows for fast comparisons of the input and repository data by searching these limited distinguishing characteristics instead of a bit-by-bit comparison between the input chunk and every chunk stored in the repository. In one embodiment, performing the similarity search may be performed as the input data is being received, which may be deemed to be performing in real time. During a similarity search by the similarity comparator 330, when the values of a repository chunk are found as matching those of an input chunk, the location of the matching chunk within the repository 370 may be readily known by extracting associated memory address data stored as part of the index 360. The index 360 may grow with time as new input chunks are incorporated into the repository and the distinguishing characteristics associated with the input chunks are added to the index 360.

The power grid controller 210 may also include an event comparator 340. Once it is determined that an input chunk correlates one or more repository chunks, an event comparator 340 may be used to determine whether the matching repository chunk or chunks correspond to an event affecting the power grid 100. It may be determined whether an input chunk correlates with a repository chunk by comparing their respective distinguishing characteristics. Each chunk stored in the repository is data related to operation of a power grid at a particular time in the past. Metadata for each repository chunk may include one or more indicators that designate whether a chunk is associated with a past event related to operation of a power grid e.g., blackout, brownout, power surge, power surplus. The association may be that the repository chunk coincided with a past event relevant to operation a power grid. In addition, the association may be that the repository chunk preceded the past event by a particular period of time. In one embodiment, power grid event indicators are stored in the index 360. Alternatively or additionally, power grid event indicators may be stored in the storage repository 370. The sequence of operations performed by the event comparator 340 and the operations performed by the identity determiner 350, described below, may be reversed from that shown in FIG. 3 in one embodiment.

The power grid controller 210 may also include an identity determiner 350. The identity determiner 350 may further compare the input chunk and its corresponding similar repository chunk to determine whether the input chunk and the repository chunk are identical or nearly identical, and may identify the exact differences between the similar chunks. If a repository chunk is not determined to be similar, no identity determination need be made. The control laws 380 may define a threshold as to how identical the input chunk and repository chunk have to be before identity determiner 350 declares a match. A more detailed comparison (or supplemental) algorithm may be applied for comparing the full data of the respective chunks (and not only the n distinguishing characteristics). Typical, yet not exclusive, examples of such algorithms are binary difference and byte-wise factoring types of algorithms. See U.S. Pat. No. 7,523,098 for a further description of one example of a binary difference algorithm. If an identical or nearly identical match is determined and the similar repository chunk corresponds to a power grid event, then the power grid controller 210 may alert a user through a user interface 390 of the match and how long before the historical event the repository data was sampled, e.g., 8 hours, 4 hours, 15 minutes. The closer in time to the event, the more significant the alert may be. The power grid controller may also autonomously take action to prevent the power grid event.

Figure 4:
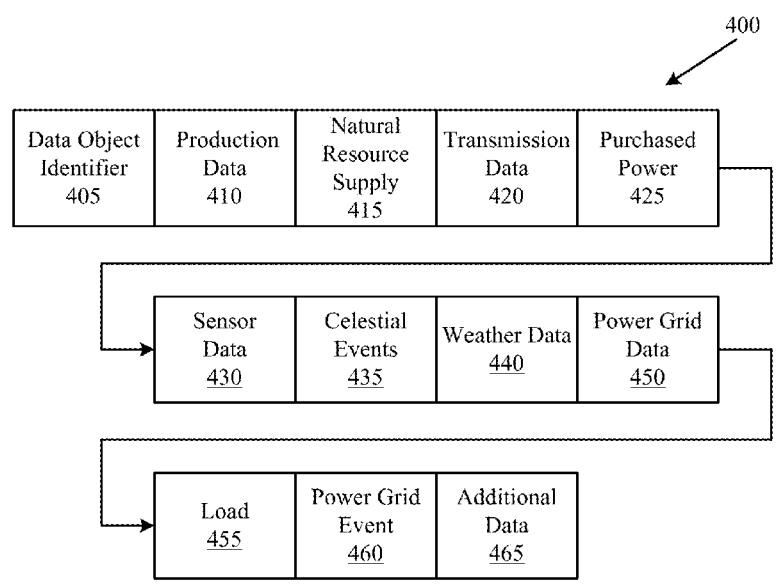
FIG. 4 is a block diagram of a data chunk formatted by a data sequencer of FIG. 3 according to one embodiment.

According to one embodiment, the data sequencer 310 may format the input data into input data chunks 400 as illustrated in the block diagram of FIG. 4. The input chunk 400 may include a plurality of power grid data elements. The data sequencer 310 may arrange the data elements according to the instructions given by the control laws 330 into an input chunk 400. FIG. 4 illustrates an exemplary embodiment of arranging the data elements into an input chunk 400, but the amount of data, type of data, and order of data may be arranged in variations from what is illustrated. The data chunk 400 in FIG. 4 may contain data elements such as, but not limited to: energy production data 410, natural resource supply data 415, transmission data 420, purchased power data 425, sensor data 430, celestial events data 435, weather data 440, power grid data 450, load data 455, type of event data 460, and additional relevant internal and external power grid data 465, such as the time and date of the input data. The data sequencer 310 may also assign a data object identifier 405 to the data chunk 400 for tracking the data chunk 405.

Figure 5:
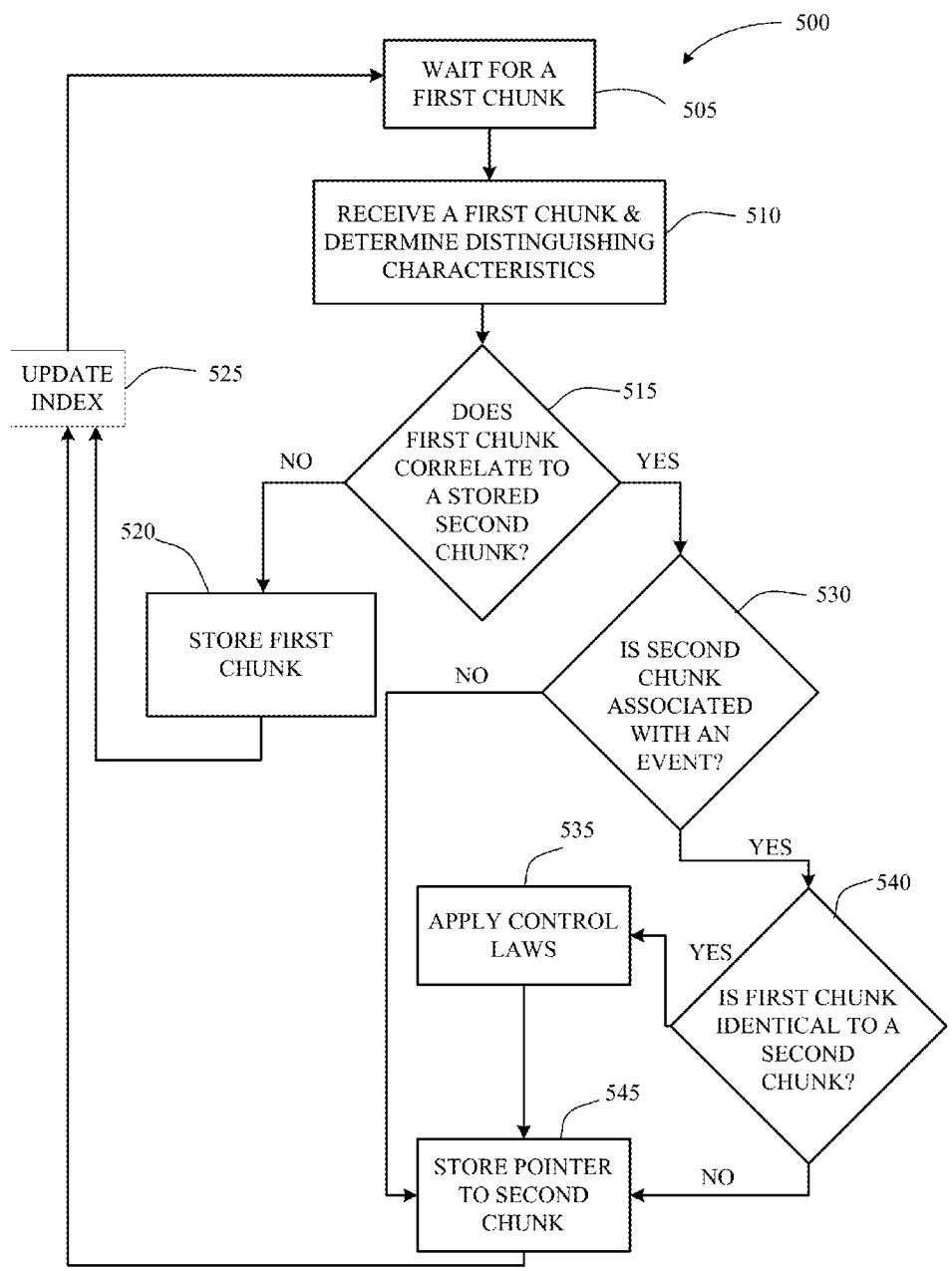
FIG. 5 is a flowchart of one method for predicting an event affecting the power grid, according to one embodiment.

According to one embodiment, FIG. 5 is a flowchart illustrating a method 500 for identifying conditions that correlate with one or more events related to operation of a power grid. In operation 505, the power grid controller 210 may wait for a first chunk from the data sequencer 310. In operation 510, the distinguishing characteristic calculator 320 may receive the first chunk and determine one or more distinguishing characteristics of the first chunk as explained above. Once the calculator 320 determines the distinguishing characteristics of the first chunk, a distinguishing characteristic of the first chunk may be compared with a distinguishing characteristic of the second chunk (repository chunks) to determine whether the chunks are correlated, in operation 515. In one embodiment, determining whether a distinguishing characteristic of the first chunk correlates with a distinguishing characteristic of one or more of a plurality of second chunks as data is received may be deemed to be performing in real time. The similarity comparison, in operation 515, may be performed by the similarity comparator 330. If the distinguishing characteristics of the first chunk are not correlated to the distinguishing characteristics of the second chunk, then in operation 520 the first chunk may be stored in the repository 370. In operation 525, the index 300 may also be updated with the distinguishing characteristics of the first chunk and the method 500 begins again at operation 505.

If the distinguishing characteristics of the first chunk are correlated to the distinguishing characteristics of the second chunk, then in operation 530 the event comparator 340 may determine whether the second chunk is associated with one or more events affecting the power grid. If the second, similar chunk is not associated with one or more events, then a pointer to a stored, similar chunk may be stored in the repository 370 in operation 545. The index 360 may also be updated with the distinguishing characteristics of the first chunk in operation 525. If the second, similar chunk is associated with one or more events, then, in operation 540, it may be determined whether the first chunk is identical to the second chunk. The chunks may be compared through a comparison algorithm, such as a binary difference algorithm, by the identity determiner 350. Whether the first chunk and the second chunk may be considered identical may be governed by a threshold specified in the control laws 380. Where a threshold is specified, a first and second chunk may be deemed to be substantially identical if 95% of the compared bytes are identical, according to one embodiment. In another embodiment, where a threshold is specified, a first and second chunk may be deemed to be substantially identical if 99% of the compared bytes are identical. In yet another embodiment, a first and second chunk may be deemed to be substantially identical if 100% of the compared bytes are identical. If the first chunk and second chunk are not identical, then, in operation 545, pointers may be stored to the similar second chunk and the index 360 may be updated with the distinguishing characteristics of the first chunk in operation 525. If the first chunk is identical to the second chunk, then the control laws 380 are applied for the specific event. The control laws 380 may alert a user through a user interface 390 to take specific action to avoid the event or the control laws 380 may enable the power grid controller to autonomously take action to avoid the event.

Figure 6:
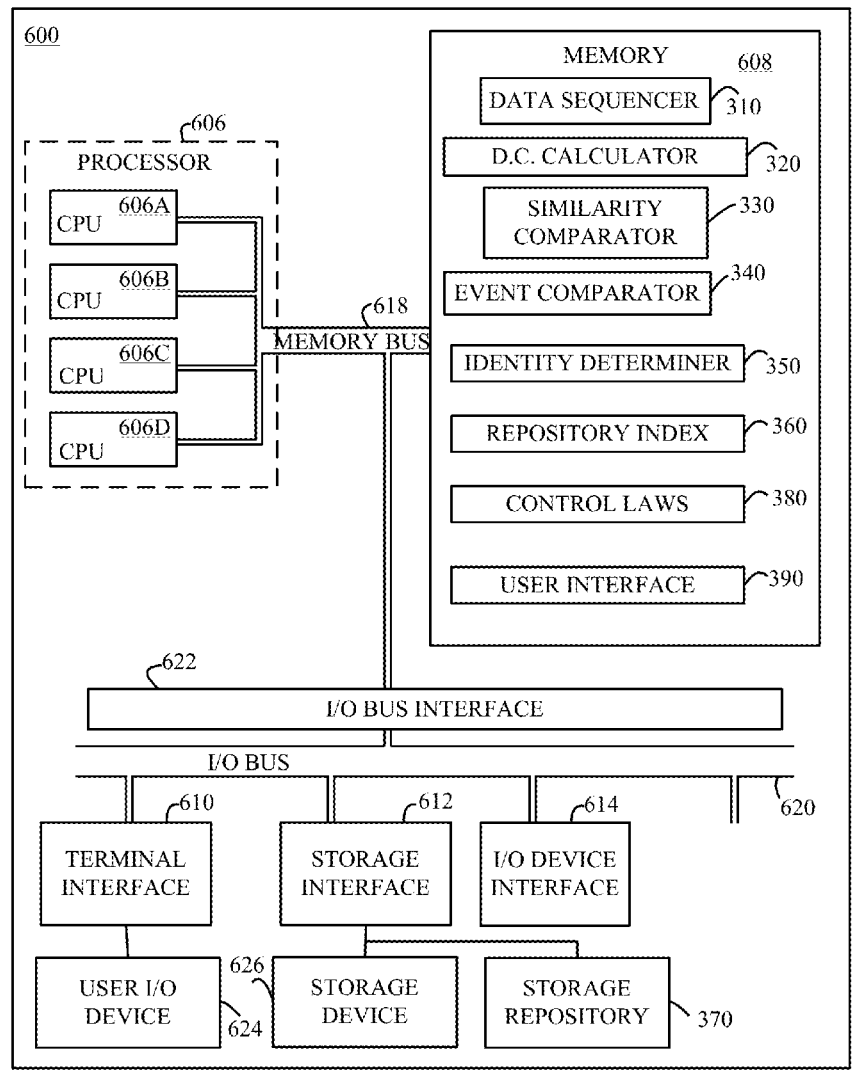
FIG. 6 is a high-level block diagram of an exemplary computer system for implementing an embodiment.

FIG. 6 depicts a high-level block diagram representation of a computer system 600 illustrating one exemplary context in which embodiments may be implemented. The major components of the computer system 600 may include one or more processors 606, a main memory 608, a terminal interface 610, a storage interface 612, an I/O (Input/Output) device interface 614, and a storage repository 370 all of which may be communicatively coupled, directly or indirectly, for inter-component communication via a memory bus 618, an I/O bus 620, and an I/O bus interface unit 622.

The computer system 600 may contain one or more general-purpose programmable central processing units (CPUs) 606A, 606B, 606C, and 606D, herein generically referred to as the processor 606. In an embodiment, the computer system 600 may contain multiple processors typical of a relatively large system; however, in another embodiment the computer system 600 may alternatively be a single CPU system. Each processor 606 may execute instructions stored in the main memory 608 and may include one or more levels of on-board cache.

In an embodiment, the main memory 608 may include a random-access semiconductor memory, storage device, or storage medium (either volatile or non-volatile) for storing or encoding data and programs. In another embodiment, the main memory 608 may represent the entire virtual memory of the computer system 600, and may also include the virtual memory of other computer systems coupled to the computer system 600. The main memory 608 may be conceptually a single monolithic entity, but in other embodiments the main memory 608 may be a more complex arrangement, such as a hierarchy of caches and other memory devices.

The main memory 608 may store or encode the data sequencer 310, the distinguishing characteristic calculator 320, the similarity comparator 330, the event comparator 340, the identity determiner 350, the repository index 360, the control laws 380, and the user interface 390. Although the data sequencer 310, the distinguishing characteristic calculator 320, the similarity comparator 330, the event comparator 340, the identity determiner 350, the repository index 360, the control laws 380, and the software for implementing the user interface 390 are illustrated as being contained within the memory 608 in the computer system 600, in other embodiments some or all of them may be on different computer systems and may be accessed remotely. The computer system 600 may use virtual addressing mechanisms that allow the programs of the computer system 600 to behave as if they only have access to a large, single storage entity instead of access to multiple, smaller storage entities. Thus, while the data sequencer 310, the distinguishing characteristic calculator 320, the similarity comparator 330, the event comparator 340, the identity determiner 350, the repository index 360, the control laws 380, and the user interface 390 are illustrated as being contained within the main memory 608, these elements are not necessarily completely contained in the same storage device at the same time. Further, although the data sequencer 310, the distinguishing characteristic calculator 320, the similarity comparator 330, the event comparator 340, the identity determiner 350, the repository index 360, the control laws 380, and the user interface 390 are illustrated as being separate entities, in other embodiments some of them, portions of some of them, or all of them may be packaged together.

In an embodiment the data sequencer 310, the distinguishing characteristic calculator 320, the similarity comparator 330, the event comparator 340, the identity determiner 350, the repository index 360, the control laws 380, and the user interface 390 may include instructions or statements that execute on the processor 606 or instructions or statements that may be interpreted by instructions or statements that execute on the processor 606, to carry out the functions as further described above with reference to FIGS. 1, 2, 3, 4, and 5. In another embodiment the data sequencer 310, the distinguishing characteristic calculator 320, the similarity comparator 330, the event comparator 340, the identity determiner 350, the repository index 360, the control laws 380, and the user interface 390, or two or more of these elements may be implemented in hardware via semiconductor devices, chips, logical gates, circuits, circuit cards, other physical hardware devices, or a combination of these devices in lieu of, or in addition to, a processor-based system. In an embodiment the data sequencer 310, the distinguishing characteristic calculator 320, the similarity comparator 330, the event comparator 340, the identity determiner 350, the repository index 360, the control laws 380, and the user interface 390, or two or more of these elements may include data in addition to instructions or statements.

The memory bus 618 may provide a data communication path for transferring data among the processor 606, the main memory 608, and the I/O bus interface 622. The I/O bus interface 622 may be further coupled to the I/O bus 620 for transferring data to and from the various I/O units. The I/O bus interface unit 622 communicates with multiple I/O interface units 610, 612, 614, and 616, which may also be known as I/O processors (IOPs) or I/O adapters (IOAs), through the I/O bus 620.

The I/O interface units support communication with a variety of storage and I/O devices. For example, the terminal interface unit 610 supports the attachment of one or more user I/O devices 624, which may include user output devices (such as a video display device, speaker, or television set) and user input devices (such as a keyboard, mouse, keypad, touchpad, trackball, buttons, light pen, or other pointing device). A user may manipulate the user input devices utilizing a user interface, in order to provide input data and commands to the user I/O device 624 and the computer system 600, and may receive output data via the user output devices. For example, a user interface may be presented via the user I/O device 624, such as displayed on a display device, played via a speaker, or printed via a printer.

The storage interface 612 supports the attachment of one or more disk drives or direct access storage devices 626 (which are typically rotating magnetic disk drive storage devices, although they could alternatively be other storage devices, including arrays of disk drives configured to appear as a single large storage device to a host computer) or storage repository 370. In one embodiment, the storage repository 370 may be a storage area network having one or more servers and a plurality of storage devices 626. In another embodiment, the storage device 626 and storage repository 370 may be implemented via any type of secondary storage device. The contents of the main memory 608, or any portion thereof, may be stored to and retrieved from the storage device 626 and storage repository 370 as needed. The I/O device interface 614 may provide an interface to any of various other input/output devices or devices of other types, such as printers or fax machines.

Referring to FIG. 6 in various embodiments, the computer system 600 may be a multi-user mainframe computer system, a single-user system, or a or similar device that has little or no direct user interface, but receives requests from other computer systems (clients). In other embodiments, the computer system 600 may be implemented as a desktop computer, portable computer, laptop or notebook computer, tablet computer, pocket computer, telephone, smart phone, or any other appropriate type of electronic device.

The computer system 602 may include some or all of the hardware and/or computer program elements of the computer system 600. The various program components implementing various embodiments of the invention may be implemented in a number of manners, including using various computer applications, routines, components, programs, objects, modules, data structures, etc., and are referred to herein as "computer programs," or simply "programs."

The computer programs include one or more instructions or statements that are resident at various times in various memory and storage devices in the computer system 600 and that, when read and executed by one or more processors in the computer system 600, or when interpreted by instructions that are executed by one or more processors, cause the computer system 600 to perform the actions necessary to execute steps or elements including the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device), or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. For example, a computer-readable storage medium may be, but not limited to, an electronic, magnetic, optical, electromagnetic, infrared, or semiconductor system, apparatus, or device, or any suitable combination of the foregoing. More specific examples (an non-exhaustive list) of the computer-readable storage media may include: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may include a propagated data signal with computer-readable program code embodied thereon, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which includes one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, nonprofit organization, government entity, or internal organizational structure. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described herein may be identified based upon the application for which they are implemented in a specific embodiment of the invention. But, any particular program nomenclature used herein is used merely for convenience, and thus embodiments of the invention are not limited to use solely in any specific application identified and/or implied by such nomenclature. The exemplary environments illustrated in FIG. 6 are not intended to limit the present invention. Indeed, other alternative hardware and/or program environments may be used without departing from the scope of embodiments of the invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

What is claimed is:

1. A method for identifying conditions that correlate with a plurality of events related to operation of a power grid, comprising: formatting input data into a first chunk;
   determining one or more distinguishing characteristics of a first chunk, the first chunk including data elements relevant to operating a power grid, wherein the data elements of the first chunk include weather data, sample date data, and sample time data;
   comparing the data elements of the first chunk to every chunk of a plurality of chunks stored within a repository of previously formatted input data, wherein data elements of each chunk of the plurality of chunks include weather data, date data, and time data, wherein some chunks of the plurality of chunks are not associated with any events of the plurality of events, wherein events of the plurality of events include a blackout, a brownout, and a power surplus;
   determining that a distinguishing characteristic of the first chunk is equivalent to a distinguishing characteristic of a second chunk of the plurality of chunks, wherein one or more chunks of the plurality of chunks include a plurality of data elements corresponding with the data elements of the first chunk;
   in response to determining that the distinguishing characteristic of the first chunk is equivalent to the distinguishing characteristic of the second chunk, determining whether the second chunk is associated with an event of the plurality of events;
   in response to determining that both the second chunk is associated with the event and the distinguishing characteristic of the first chunk is equivalent to the distinguishing characteristic of the second chunk, determining whether the second chunk is substantially identical to the first chunk; and
   generating a pointer in an index from the first chunk to the second chunk when the first chunk is not substantially identical to the second chunk, wherein the pointer creates a correlation between power grid data of the first chunk and the second chunk; and
   adjusting the power grid in response to the determination that the second chunk is substantially identical to the first chunk.

2. The method of claim 1, wherein the determining whether the second chunk is substantially identical to the first chunk comprises a determination that the second chunk meets a similarity threshold to the first chunk.

3. The method of claim 2, wherein the determining of whether the second chunk meets the similarity threshold to the first chunk includes comparing each pair of corresponding bytes of the first and second chunks.

4. The method of claim 1, further comprising storing the first chunk in the index.

5. The method of claim 1, wherein the input data includes power grid data and external data.

6. The method of claim 1, wherein the determining whether the distinguishing characteristic of the first chunk correlates with the distinguishing characteristic of the second chunk is performed in real time.

7. The method of claim 1, wherein data elements of the second chunk are associated with a first time and data elements of the first chunk are associated with a second time, the first time preceding the second time.

8. A power grid controller, comprising:
   a data formatter to format input data into a first chunk;
   a distinguishing characteristic calculator to determine one or more distinguishing characteristics of the first chunk, the first chunk including data elements relevant to operating a power grid, wherein the data elements of the first chunk include weather data, sample date data, and sample time data;
   a similarity comparator to compare the data elements of the first chunk to every chunk of a plurality of chunks stored within a repository of input data that was previously formatted, wherein data elements of each chunk of the plurality of chunks include weather data, sample date data, and sample time data, wherein some chunks of the plurality of chunks are not associated with any events of the plurality of events, wherein events of the plurality of events include a blackout, a brownout, and a power surplus, wherein the similarity comparator determines that a distinguishing characteristic of the first chunk is equivalent to a distinguishing characteristic of a second chunk of the plurality of chunks, wherein chunks of the plurality of chunks include a plurality of data elements corresponding with the data of the first chunk;
   an event comparator to determine, in response to the similarity comparator determining that the distinguishing characteristic of the first chunk is equivalent to the distinguishing characteristic of the second chunk, whether the second chunk is associated with an event of the plurality of events;
   an identity determiner to determine, in response to both the event comparator determining that the second chunk is associated with the event and the similarity comparator determining that the distinguishing characteristic of the first chunk is equivalent to the distinguishing characteristic of the second chunk, whether the second chunk is substantially identical to the first chunk; and
   a point generator to generate a pointer from the first chunk to the second chunk when the first chunk is not substantially identical to the second chunk, wherein the pointer creates a correlation between the first chunk and the second chunk; and
   wherein the power grid controller adjusts a power grid in response to the determination that the second chunk is substantially identical to the first chunk.

9. The power grid controller of claim 8, wherein the determining whether the second chunk is substantially identical to the first chunk comprises a determination that the second chunk meets a similarity threshold to the first chunk.

10. The power grid controller of claim 8, further comprising a storage repository to store the plurality of second chunks.

11. The power grid controller of claim 8, further comprising a memory to store an index of distinguishing characteristics.

12. A non-transitory computer readable storage medium having instructions stored thereon which, when executed, cause a processor to perform the following operations:

formatting Input data into a first chunk;

determining one or more distinguishing characteristics of the first chunk, the first chunk including data elements relevant to operating a power grid, wherein the data elements of the first chunk include weather data, date data, and time data;

comparing the data elements of the first chunk to every chunk of a plurality of chunks stored within a repository of input data that was previously formatted, wherein data elements of each chunk of the plurality of chunks include weather data, date data, and time data, wherein some chunks of the plurality of chunks are not associated with any events of a plurality of events, wherein events of the plurality of events include a blackout, a brownout, and a power surplus;

determining that a distinguishing characteristic of the first chunk is equivalent to a distinguishing characteristic of a second chunk of a plurality of chunks, wherein one or more chunks of the plurality of chunks include a plurality of data elements corresponding with the data of the first chunk, wherein data elements of each chunk of the plurality of chunks include weather data, date data, and time data;

in response to determining that the distinguishing characteristic of the first chunk is equivalent to the distinguishing characteristic of the second chunk, determining whether the second chunk is associated with an event of the plurality of events;

in response to determining that both the second chunk is associated with the event and the distinguishing characteristic of the first chunk is equivalent to the distinguishing characteristic of the second chunk, determining whether the second chunk is substantially identical to the first chunk;

generating a pointer in the index from the first chunk to the second chunk when the first chunk is not substantially identical to the second chunk, wherein the pointer creates a correlation between smart grid data of the first chunk and the second chunk; and adjusting the power grid in response to the determination that the second chunk is substantially identical to the first chunk.

13. The storage medium of claim 12, wherein the determining whether the second chunk is substantially identical to the first chunk comprises a determination that the second chunk meets a similarity threshold to the first chunk.

14. The storage medium of claim 13, wherein the determining of whether the second chunk meets the similarity threshold to the first chunk includes comparing each pair of corresponding bytes of the first and second chunks.

15. The storage medium of claim 12, further comprising the operation of storing the first chunk in an index.

16. The storage medium of claim 15, wherein the input data include power grid data and external data.

17. The storage medium of claim 12, wherein data elements of the second chunks are associated with a first time and data elements of the first chunk are associated with a second time, the first time preceding the second time.

* * * * *